US005983655A

United States Patent [19]

Kistner et al.

[11] Patent Number: 5,983,655

[45] Date of Patent: Nov. 16, 1999

[54] THERMAL STORAGE MONITORING AND CONTROL SYSTEM FOR CARGO CONTAINER

[75] Inventors: William Paul Kistner, Jamesville; J. Michael Griffin, Fayetteville; August W. Gutheim, Chittenango, all of N.Y.

[73] Assignee: Carrier Corporation, Farmington, Conn.

[21] Appl. No.: 09/129,292

[22] Filed: Aug. 5, 1998

[51] Int. Cl.[6] .................................................. F25B 49/02

[52] U.S. Cl. ................................ 62/208; 62/163; 62/213; 62/229

[58] Field of Search ............................ 62/208, 209, 213, 62/203, 157, 158, 229, 59, 201, 163; 236/91 R, 91 A, 91 C, 91 F, 91 E

[56] References Cited

U.S. PATENT DOCUMENTS

| | | | |
|---|---|---|---|
| 4,040,565 | 8/1977 | Christiansen | 236/91 R X |
| 4,089,462 | 5/1978 | Bradford | 236/91 R X |
| 4,495,780 | 1/1985 | Kaneko et al. | 62/209 X |
| 5,293,755 | 3/1994 | Thomas | 62/208 |

*Primary Examiner*—Harry B. Tanner
*Attorney, Agent, or Firm*—Wall Marjama Bilinski and Burr

[57] ABSTRACT

A thermal storage monitoring and control system employed on a container refrigeration unit utilizes a "thermal fly-wheel" algorithm in combination with a data processor to control the temperature level within a cargo container to a maximum value. The thermal monitoring and control system operates the refrigeration system in a manner that causes the heat gain by the load during hot afternoons and evenings to be offset by the thermal storage built into the cargo. The monitoring and control system can be configured to operate automatically or manually.

17 Claims, 3 Drawing Sheets

THERMAL STORAGE MONITORING AND CONTROL SYSTEM FOR CARGO CONTAINER

BACKGROUND OF THE INVENTION

1. Field of the Invention

This invention relates to refrigeration systems. More particularly, this invention relates to a refrigeration unit having a thermal storage control system that automatically adjusts the refrigeration unit set point within a cargo container that is loaded with refrigerated cargo, to utilize the frozen load of the cargo container itself to protect against drift above a set point during high ambient conditions or increased container heatleakage.

2. Description of the Prior Art

Thermal storage concepts have been widely used for hundreds of years. Conventional container refrigeration systems such as those using reciprocating compressor based systems, familiar to those skilled in the art of transport refrigeration, have generally been capable of holding deep frozen container temperatures (−20° F. and below) when the ambient temperatures are below 80 to 85° F. and the cargo containers are new with relatively low heat leakages. However, as cargo containers age, the container insulation degrades, making it increasingly more difficult to maintain the aforesaid deep frozen temperatures within these cargo containers to ensure the cargo being transported arrives at its destination without even minor impairment. In view of the above, attempts have been made by those skilled in the art of transport refrigeration to design and manufacture systems which utilize various refrigerants and/or compressor technologies.

Still needed, but not available with cargo container refrigeration systems presently known in the art is a refrigeration system that is capable of also reliably and efficiently establishing and maintaining precise deep frozen container temperature levels within a loaded cargo container, even during time periods when normal refrigeration system capacity is severely limited, such as when the cargo container insulation has deteriorated and/or ambient temperatures rise to levels that test the refrigeration capacity limits of the cargo container refrigeration unit.

SUMMARY OF THE INVENTION

Accordingly, the present inventive transport refrigeration system provides a structure and method intended to overcome many of the shortcomings and attendant disadvantages of known container/transport refrigeration systems that share problems considered unavoidable within the industry, some of which have been discussed herein above. The present invention surmounts these problems with a radical new apparatus that combines a data processor to accommodate a thermal storage process to improve and optimize refrigeration system capacity within a loaded and sealed cargo container. The process control system constructed according to one preferred embodiment of the present invention comprises a microprocessor or computer implemented device to control the loaded cargo container temperature level to a value lower than set-point during cool parts of the day, when the refrigeration system capacity is greatest. In this manner, the frozen cargo being transported can act as a "thermal flywheel" (or cold storage device) during hot parts of the day to ensure that the maximum container temperature at that time does not exceed a preset level. The preferred device comprises: a data processing device; an input device in communication with the data processing device; an algorithmic software directing the data processing device; and a data storage unit, wherein digitized temperature, container and cargo data can be extracted and supplied to the data processing device such that the data processing device, directed by the algorithmic software, can expand the digitized temperature, container and cargo data and synthesize enhanced data to automatically control cycling of the refrigeration unit, using the digitized data and algorithmically defined interrelationships between the digitized temperature, container, and cargo data.

As used herein, the following words have the following meanings. The word "enhance" means a process of developing refined data by interpreting related data points from an existing data base to generate new data points based on extrapolation, interpolation, modeling, extension, or the like, or a combination thereof to increase the number of data points to include the newly generated data points. In this way, the existing data base can be "enhanced". The word "synthesize" means to create an enhanced model from a set of digitized data points. As used herein in relation to the use of data points from digitized transducer information, to "synthesize" a control model means to create a control model base including new data points created by a process wherein existing data points from the existing data base are "enhanced" and an "enhanced" model is created. The words "algorithmic software" means an algorithmic program used to direct the processing of data by a computer or data processing device. The word "extracting" describes a device-implemented mathematical process or software directed computer process of selecting data from a given set of data points based on a predefined criteria for selecting data. "Data extraction" is a software directed or device-implemented process of selecting data from a given set of data points based on a predefined criteria for selection among the set. The word "expanding" means creating new data points based on a parameter or parameters consistent with a selected group of existing data points. The words "software implemented" as used herein refer to the use of a software program on a particular computer system. Similarly, the words "computer implemented device" refer to the use of a computer system on a particular device. The words "discrete data" as used herein are interchangeable with "digitized data", and "digitized data" as used herein means data which are electromagnetically stored in the form of singularly isolated, discontinuous data or digits. The words "data processing device" as used herein refer to a CPU and an interface system. The interface system provides access to the CPU such that data could be entered and processed by the data processing device.

A feature of the present invention is the provision of a container/transport refrigeration process control system that utilizes an associated logic to control the aforesaid refrigeration unit cycling during cool periods of frozen cargo transport, thereby enhancing the capacity of the refrigeration system during hot periods of frozen cargo transport.

Another feature of the present invention is the provision of a container/transport refrigeration system having an integrated "thermal flywheel" process control system, thereby increasing user perception of system operation and capability.

From the foregoing, it is clear that the present inventive refrigeration process control system versatility, reliability and performance is greatly enhanced over existing systems. Other features of the present inventive apparatus include ease of use, enhanced serviceability, maintainability, upgradability, and enhanced expansion and diagnostics capability.

BRIEF DESCRIPTION OF THE DRAWINGS

Other objects and features of the present invention and many of the attendant advantages of the present invention will be readily appreciated as the same becomes better understood by reference to the detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way or representation and not limitation. Numerous other modifications and embodiments can be devised by those skilled in the art which fall within the scope and spirit of the principles of this invention.

DETAILED DESCRIPTION OF THE PREFERRED EMBODIMENT(S)

The preferred embodiments described herein as follows address the long felt need by those in the container/transport refrigeration industry to provide a cargo container refrigeration system capable of maintaining its operational efficiency, even when used in combination with aging cargo containers with degraded insulation and thermal leakage characteristics. In accordance with the present invention, the preferred embodiments described herein can readily and reliably function to monitor and control temperature levels within a sealed cargo container such that the frozen cargo within the cargo container acts as a "thermal flywheel" during hot parts of the day to ensure that the maximum container temperature at that time does not exceed a preset level.

Transport refrigeration systems are known in the art to monitor and control the temperatures within cargo containers. The present inventors realized that a conventional container/transport refrigeration system could be modified according to the present invention, to also monitor and further control the aforesaid temperature level within a sealed cargo container during time periods when the refrigeration system is normally inoperative, i.e. continue cooling even when normal temperature set points are attained to realize those set-points during these hot parts of the day when the desired set-point would otherwise not be obtained.

A brief description of transport refrigeration operation is first presented herein below with reference to FIG. 1 to provide a background in preparation for a discussion of the preferred embodiments of the present inventive refrigeration control system that follow there after.

Figure 1:
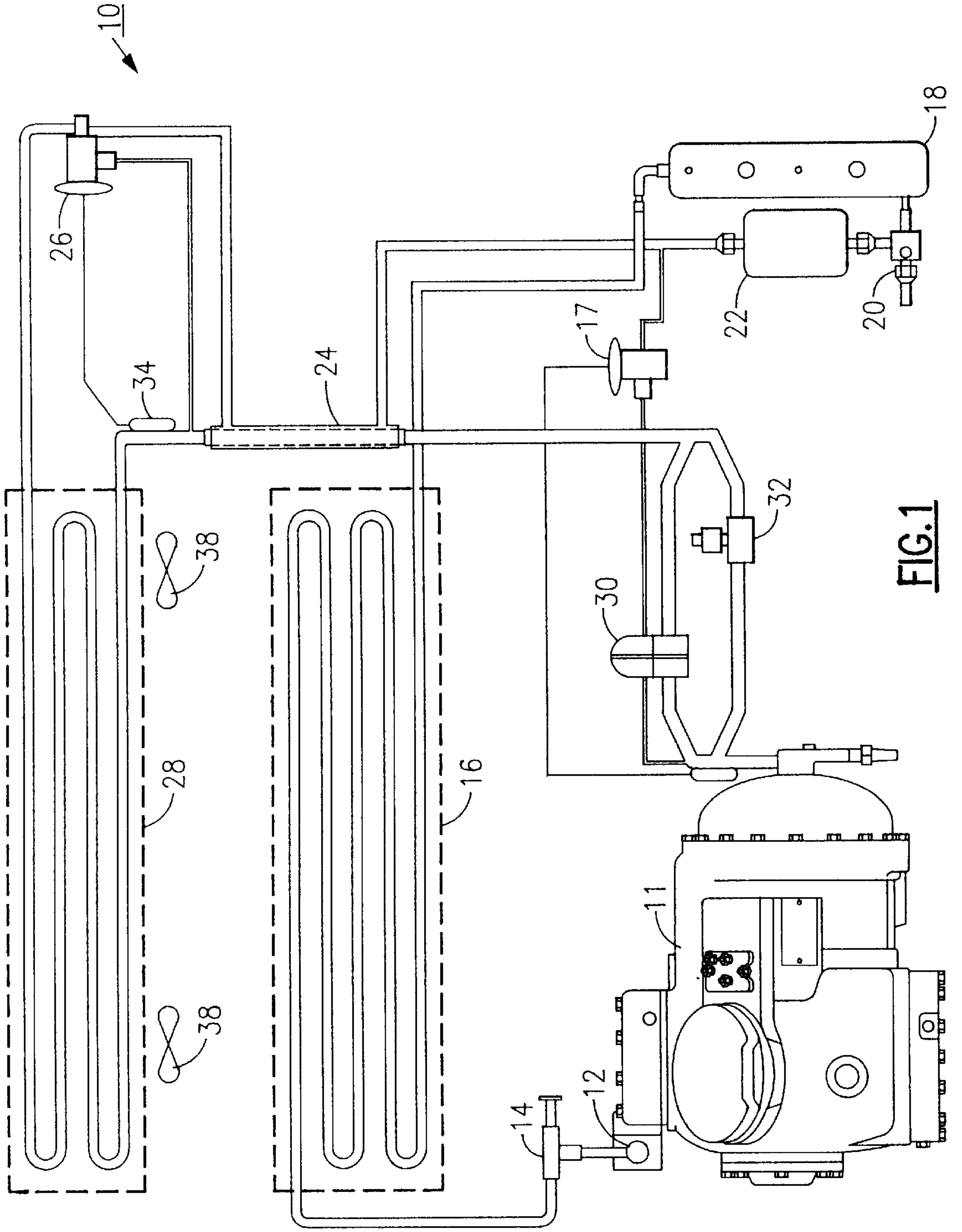
FIG. 1 is a simplified schematic diagram illustrating one embodiment of a container refrigeration system familiar to those skilled in the art of container/transport refrigeration.

Referring to FIG. 1, a simplified schematic diagram illustrates one embodiment of a container refrigeration system 10 familiar to those skilled in the art of container/transport refrigeration systems. Operation of the refrigeration system 10 can best be understood by starting at the compressor 11, where the suction gas (refrigerant) is compressed to a higher temperature and pressure. When operating with the air-cooled condenser 16, the gas flows through the compressor discharge service valve 12 into a pressure regulator valve 14 that is normally open. The pressure regulator valve 14 restricts the flow of refrigerant to maintain a predetermined minimum discharge pressure. Refrigerant gas then moves into the air-cooled condenser 16. Air flowing across a group of condenser coil fins and tubes cools the gas to its saturation temperature. By removing latent heat, the gas condenses to a high pressure/high temperature liquid and flows to a receiver 18 that stores additional charge necessary for low temperature operation. Conventional condenser pressure control transducers/sensors can be installed within the receiver 18 or can be located at any point on the high pressure side of the refrigeration system 10 to adapt the system 10 for use with pressure control logic such that high side pressures can be limited and maintained. The words "high pressure side", as used herein refer to that portion of the refrigeration system between the compressor discharge service valve 12 and the thermostatic expansion valve 26. From the receiver 18, the liquid refrigerant continues through a manual liquid line valve 20, a filter-drier 22 (that keeps refrigerant clean and dry), and a heat exchanger 24 that increases subcooling of liquid refrigerant to a thermostatic expansion valve 26. As the liquid refrigerant passes through the orifice of the expansion valve 26, some of it vaporizes into a gas (flash gas). Heat is absorbed from the return air by the balance of the liquid, causing it to vaporize in the evaporator coil 28. The vapor then flows through a suction modulation valve 30 (and a suction solenoid valve 32 under some conditions) back to the compressor 11. A thermostatic expansion valve bulb 34 on the suction line near the evaporator coil 28 outlet controls the thermostatic expansion valve 26, maintaining a constant superheat at the coil outlet regardless of load conditions, except at abnormally high container temperatures such as during pulldown (valve at maximum operating pressure condition). The cargo container air to be cooled is passed around the evaporator 28 tubes/fins where heat is removed from the air as it is absorbed by the evaporator 28 thereby causing the temperature of the low pressure refrigerant vapor to increase before it is returned to the compressor 11. As stated herein above, the present inventors realized that the refrigeration system 10 could be modified to also use the frozen cargo as a "thermal flywheel" during hot parts of the day such that the maximum temperature within the cargo container does not exceed a preset level during hot parts of the day. This is accomplished by driving the cargo temperature below this maximum temperature limit during cool parts of the day, when the refrigeration system 10 is normally inoperative, but has the capacity to do so, such that the amount of heat gain by the load during hot afternoons and evenings can be offset by the thermal storage built into the cargo.

Figure 2:
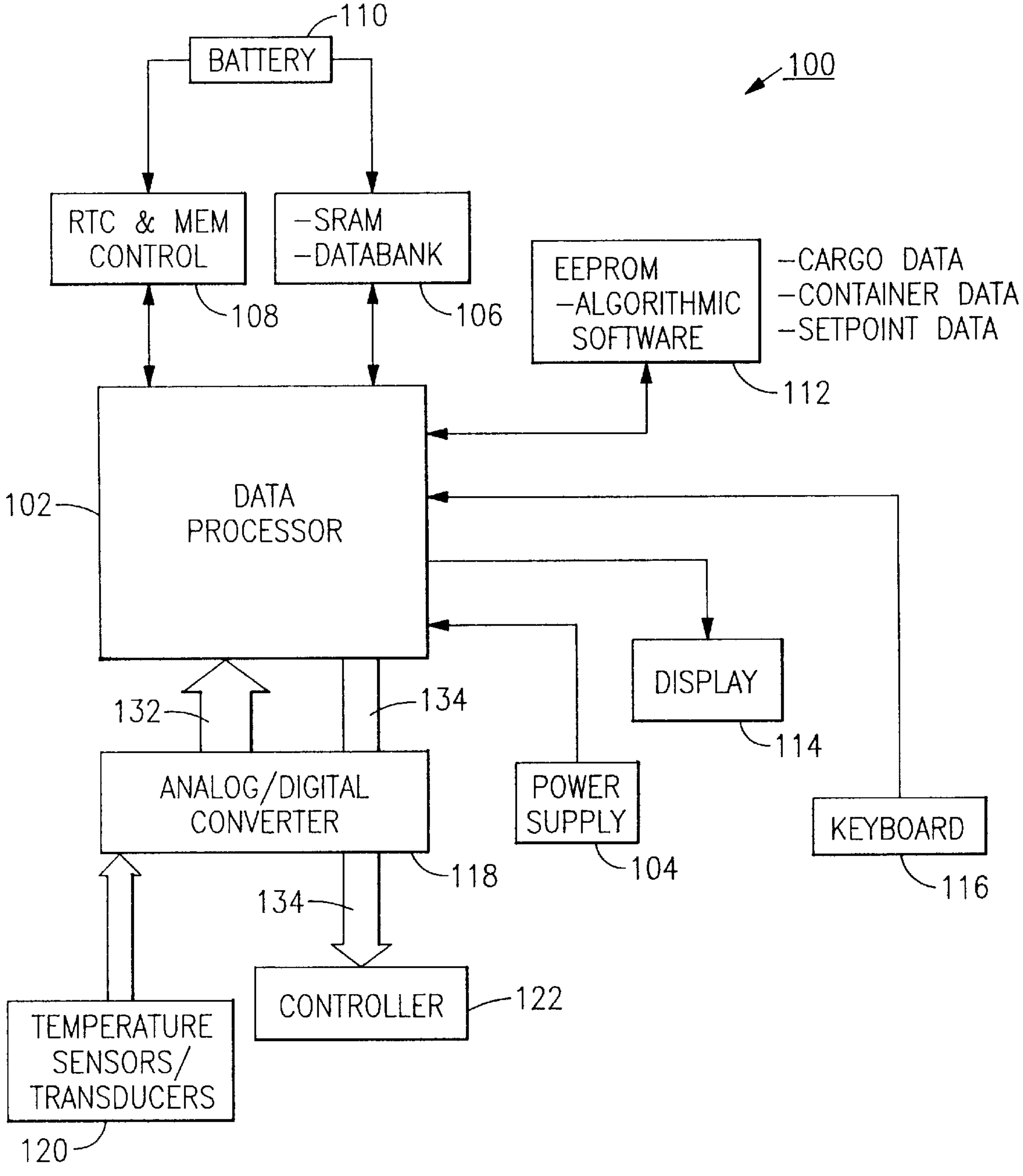
FIG. 2 is a block diagram illustrating one embodiment of a refrigeration monitoring and control system in accordance with the present invention and that is suitable for use in combination with the container/transport refrigeration system shown in FIG. 1.

Referring to FIG. 2, a block diagram illustrates one embodiment of a refrigeration monitoring and control system 100 that is suitable for use with the transport refrigeration system 10 shown in FIG. 1 to monitor and control the temperature within a sealed cargo container in accordance with the present invention. The refrigeration monitoring and control system 100 is seen to include a data processor 102 receiving signals from an analog-to-digital converter 118. The analog-to-digital converter 118 digitizes signals from a plurality of temperature sensors/transducers 120 strategically placed within the cargo container or the container/transport refrigeration unit. The data processor 102 selectively controls operation of the refrigeration system 10, based upon the digitized values read from the temperature sensors/transducers 120, temperature set-point data, cargo data, and container data Predetermined temperature set-point data, cargo data, and container data are stored in a memory unit 112 along with the algorithmic software (shown in FIG. 3). Most preferably, the predetermined temperature set-point data, container data, cargo data, and the algorithmic software are stored in a PROM such as an EEPROM familiar to those skilled in the computer arts. It will readily be appreciated that the present invention is not limited to the exact embodiment shown in FIG. 2 however, and that many other types of memory units and system architectures can also be used to accomplish the present invention so long as the present novel algorithmic software and related data are implemented and configured to accomplish the desired process of "thermal flywheel" temperature control. Most preferably, the control system 100 has a real time clock and memory control unit 108 as well as a random access memory unit 106 having a battery 110 power back-up capability to ensure the integrity of temporary data bases stored in the memory unit 106 during periods of lost power to the refrigeration system 100. The aforesaid digitized temperature sensor 120 data is then stored in the random access memory unit 106 for processing by the data processor 102 in accordance with instructions prescribed by the algorithmic software. Control system 100 is also seen to have a power supply 104 for providing power to the data processor 102.

A display 114 and a keyboard (keypad) 116 or like device are provided to supply visual humidity readings and preferably allow an operator the ability to manually access and modify the control system 100 operating parameters if desired or necessary. Thus, a system 100 operator can easily customize the system temperature set points, cargo data and container data, for example, to operate during precisely defined periods to maximize thermal storage effects attributed to the container and frozen cargo stored therein.

A controller unit 122 is seen operatively coupled via a data bus 134 to the data processor 102. The controller 122 interfaces with and is configured to commence operation of the refrigeration system 10 shown in FIG. 1 via the data processor 102 during cool parts of the day to take advantage of the thermal storage effects attributable to the frozen cargo as well as the container itself. The following example demonstrates use of the present apparatus and method to use the cargo container and its cargo within the container as a "thermal flywheel" in accordance with the present invention.

TABLE I

Frozen Cargo Incremental Set-point Required To Maintain −20° F. Container Temperature @ 120° F. Outside Ambient Temperature Within a 40 Foot Container

| | |
|---|---|
| Container Payload(A) | 58,160 lbs |
| Specific heat of cargo (B) | 0.347 BTU/lb-F (Frozen Meat) |
| Product Thermal Storage(A × B) | 20,181.52 BTU/F |
| Internal Container Material Weight(C) | 3,227 lb |
| Specific Heat(D) | 0.109 BTU/lb-F (steel) |
| Container Thermal Storage(C × D) | 351.79 BTU/F |
| Container Load @ 120° F. | 17,850 BTU/hr |
| E = (effective heat transfer coefficient of container per unit area) × (container area) × ΔT | |
| ΔT = 120° F. − (−20° F.) = 140° F. | |
| (difference between ambient target level and interior set-point) | |
| E = 127.5 × 140 BTU/hour | |
| (For a 10 year old container) | |
| Container Heat Load (BTU) During 4 Hour Period for expected maximum ambient of 120° F. | 71,400 BTU |
| F = 4 hr × (E) | |
| Capability Of Unit G | 8500 BTU/hr |
| Gap Required TC | 37,400 BTU |
| H = F − G for 4 hr period | |
| Thermal Storage Required From Frozen Cargo | 1.8° F. |
| (F)/[(A × B) + (C × D)] | |

Table I presents the preferred steps for deductively determining an effective set-point increment for maintaining the container interior temperature at a desired set-point for a given time period when the ambient temperature has reached a given temperature level. The effective temperature set-point is the temperature that must be attained within the container during a prescribed cooling period to sustain the actual set-point during periods of time when the refrigeration system has insufficient capacity. Herein, the effective set point lowers the container interior temperature to a low enough temperature to act as a thermal flywheel during periods of high ambient temperatures and maintain the container interior at the desired set point at ambient temperatures heretofore not realizable.

The preferred mathematical model determines the effective set-point depending upon the mass and specific heat of the container cargo, the container insulation abilities, the desired container set point, the presumed set-point maintenance time period, and the ambient temperature. The exemplary container characteristics include a predetermined 40 foot long container having an internal wall length of 455.5 inches, an internal width of 89.25 inches, and an internal height of 98 inches. In reference to the container characteristics, the size of the cargo container, the material from which the container is constructed, the age of the container, the type of insulation used, and the type and quantity of the cargo are all important to determining the effective temperature set-point. Addition factors may also be included. The present invention speciifically includes an air leakage to or from the cargo container, which is denoted as an air leakage to the cargo container and would be included as a term in the calculation of "Thermal Storage Required From Frozen Cargo". Related to these variables are leakage factors, specific heat characteristics, thermal storage characteristics, and ambient temperatures. The aforesaid variables, factors, characteristics and temperatures are entered into a data base via the operator or automatically during the algorithm storage process for use at a later date during operation of the refrigeration system 10. The exemplary cargo is a meat. The exemplary calculation presented alongside the mathematical model in Table I assumes a 120° F. ambient level, a four hour time period, and a −20° F. desired set point The model presented by Table I may be substituted partially or fully by experimentally derived data, or by an alternative model that determines an effective set-point for each desired set-point. According to the exemplary assumptions, the preferred model determines an effective incremental set point of 1.8° F., and a consequent effective set point of −21.8° F. (calculated by subtracting the incremental set point from the desired set point). The exemplar present embodiment attains and maintains a container temperature below −20° F. for a period of four hours at a maximum ambient temperature of 120° F.

The refrigeration system controlled by the novel thermal flywheel apparatus disclosed herein may be enabled solely by the interior container temperature exceeding the derived effective set-point temperature. The refrigeration system may alternatively be enabled automatically upon the ambient temperature reaching a specified threshold level.

The ambient temperature threshold level may be determined by construction of a mathematical model that describes the interrelationships between the known depending variables, and the subsequent solution of that model. The inventors suggest that the mathematical model be simply based upon system capacity and the expected ambient conditions, implied by the thermal Gap determined in Table I. The inventors prefer that the ambient threshold level be determined experimentally. For the container described in Table I, at an effective set point of −21.8° F., an ambient design goal of 120° F., a desired set point of −20° F., and for a four hour set point requirement, the inventors recommend an ambient threshold level of 75° F.

Figure 3:
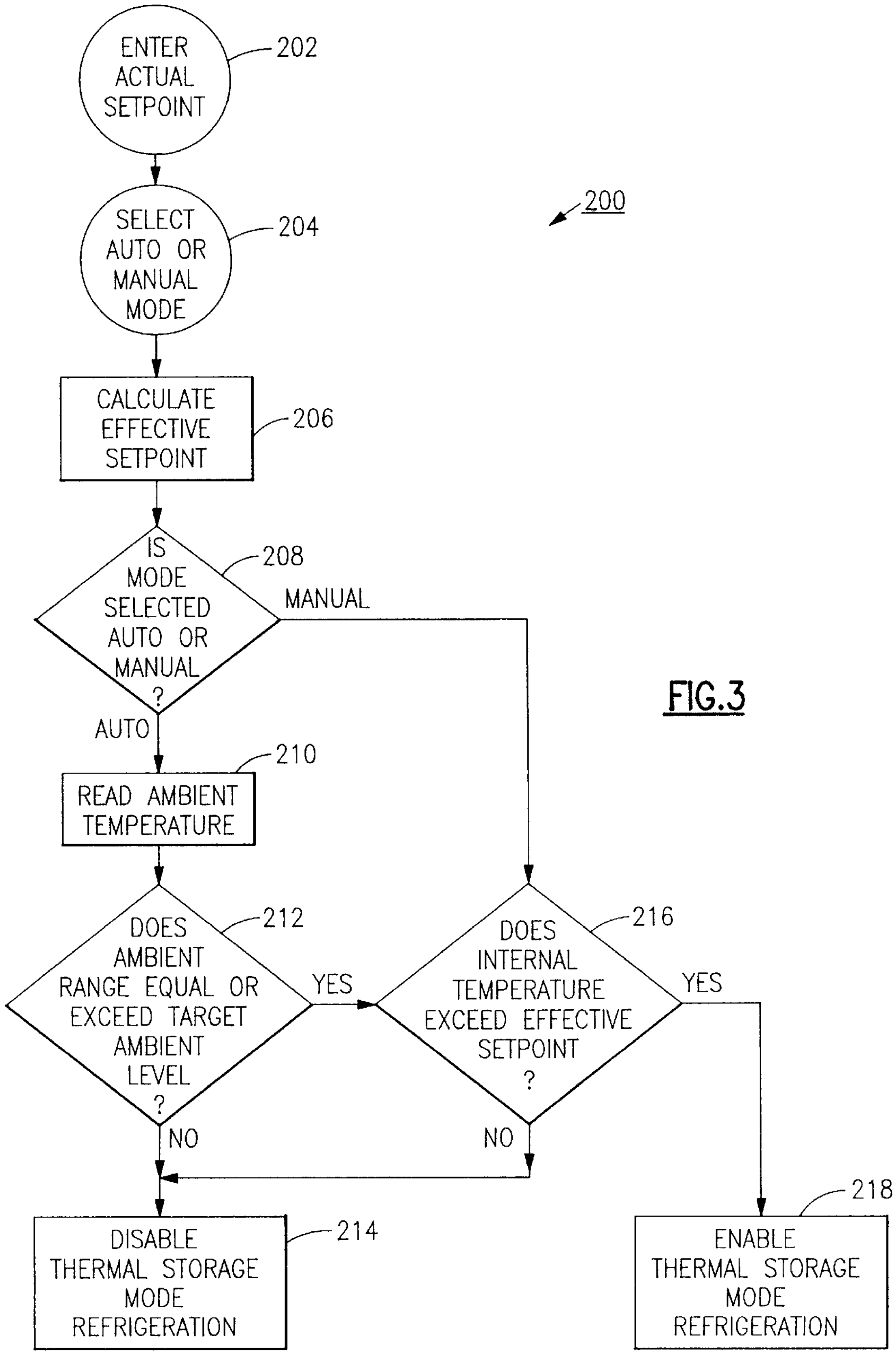
FIG. 3 illustrates an algorithmic software in accordance with one embodiment of the present invention and that is suitable for use with the monitoring and control system shown in FIG. 2.

FIG. 3 illustrates the program steps for a program 200 in accordance with one embodiment of the present invention and that is suitable for use with the refrigeration monitoring and control system 100 (FIG. 2) and the container/transport refrigeration system 10 (FIG. 1). The program 200 is executed by the data processor 102, to control and limit the cargo container temperature level to a predetermined value below the desired set-point during time periods when the normal refrigeration system controls are inactive, i.e. when the normal desired temperature set point has been attained, and when the refrigeration system 10 has the necessary capacity to further lower the container temperature. In general, the data processor 102 is combined with one or more temperature sensors/transducers 120 to sense the cargo container temperature level as well as the ambient temperature and selectively initiate one or more actions when the aforesaid ambient temperature and/or container temperature levels are above preset limits. The data processor 102 can control the effective set point to be attained by the refrigeration system 10, regardless of the actual set point input by a system user. In the preferred embodiment of FIG. 3, the operating mode is controlled via either an ambient temperature sensor 120 exceeding a predetermined ambient threshold level dependent on the unit capacity curve or by a manual input by the operator that directs the system to be in a continuous run mode.

With reference to FIG. 3, it can be seen that the aforesaid thermal flywheel process control begins following entry of actual temperature set-point data in step 202, and the preferable selection of alternatively the manual mode or of the automatic mode by the operator in step 204. In the absence of an input set-point, an embodiment may utilize a default set-point setting. The manual model denotes enablement of the thermal flywheel control when the interior container temperature matches the effective set-point, the automatic mode denotes enablement of the thermal flywheel control when the ambient temperature reaches a threshold level and the interior container temperature matches the effective set-point. The effective temperature set-point is calculated in step 206, preferably according to the relationship disclosed in Table I.

It shall be understood the present invention is not limited to particular set-points and temperatures referred to herein, and that set-points and temperature ranges other than those referred to herein can also be used under appropriate circumstances determined by factors including but not limited to type and age of cargo container, type and amount of cargo, duration of storage, system capacity, and the like.

In step 208, a determination is made whether or not the preferred mode is the automatic mode or the manual mode. If the preferred mode is the automatic mode, as described hereinabove, the refrigeration system is to be enabled according to the ambient temperature and according to the relationship of the internal temperature to the effective set point. If the preferred mode is the manual mode, the refrigeration system is to be continuously run according to the relationship of the internal temperature to the effective set point.

If in step 208, the determined mode is automatic, process control passes to step 210. In step 210 the ambient temperature is read by the processor from the temperature monitoring system. In step 212, a determination is made whether the read ambient temperature is equal to or greater than the prescribed ambient temperature threshold level. If the prescribed ambient temperature threshold level is not exceeded, control passes to step 214 wherein the refrigeration system operation reverts to conventional non-thermal storage control. The prescribed ambient temperature threshold level is the temperature at which the refrigeration system is activated to ensure that the effective set-point is attained within the container. In step 212, the comparison with a temperature threshold assumes a temperature range about the threshold level that may be non-symetric. If in step 212, the ambient temperature threshold level is exceeded, control passes to step 216 where it is determined whether or not the temperature within the cargo container exceeds the effective set-point. If the temperature in the cargo container does exceed the effective set-point, in step 218 the thermal storage mode of refrigeration is enabled. In step 218, the comparison with a temperature threshold assumes a temperature range about the threshold level that may be non-symetric.

If in step 208, the determined mode is manual, control passes to step 216, where in the case of the automatic mode, the processor determines whether or not the temperature within the cargo container exceeds the effective set-point. If the temperature within the cargo container does exceed the effective set-point, the refrigeration system is enabled in the manual mode using the relationship of the cargo container temperature and the effective set-point as the only criteria for thermal storage refrigeration mode enablement. If in step 216, the temperature within the cargo container does not exceed the effective set-point, program control passes to step 214 wherein the refrigeration system operation reverts to conventional non-thermal storage control.

In this manner, the refrigeration system 10 guarantees that the effective set-point can be maintained for a predetermined period of time during hot parts of the day, even when the refrigeration system 10 has insufficient cooling capacity to attain the effective set-point during conventional modes of operation familiar to those skilled in the art.

Having thus described the preferred embodiments in sufficient detail as to permit those of skill in the art to practice the present invention without undue experimentation, those of skill in the art will readily appreciate other useful embodiments within the scope of the claims hereto attached. For example, although the present invention has been described as useful in container/transport refrigeration systems, those of skill in the art will readily understand and appreciate that the present invention has substantial use and provides many benefits in other types of refrigeration systems as well. In general, the refrigeration industry would find the present invention useful in achieving reliable and efficient cooling for those products where high standards must be maintained to preserve resources.

In view of the foregoing descriptions, it should be apparent that the present invention represents a significant departure from prior art in apparatus and methods. However, while particular embodiments of the present invention have been described herein in detail, it is to be understood that various alterations, modifications and substitutions can be made therein without departing in any way from the spirit and scope of the present invention, as defined in the claims which follow.

We claim:

1. A method of operating a refrigeration system for a cargo container having a cargo comprising the steps of:

determining a set-point temperature for said refrigeration system;

monitoring internal cargo container temperatures via at least one temperature sensor; and cooling the cargo container via the refrigeration system if the internal cargo temperature is greater than an effective set-point temperature level prescribed by the set-point temperature wherein the internal cargo container temperature does not exceed the set-point temperature, and whereby the cooling is sustained via a cooled cargo when the ambient cargo container temperature exceeds a predetermined ambient temperature for a predetermined time.

2. The method defined in claim 1 further including the step of monitoring the ambient cargo container temperature via an at least one temperature sensor, and wherein said cooling the cargo container occurs only if the monitored ambient cargo container temperature exceeds a temperature threshold value prescribed by the set-point temperature.

3. The method defined in claim 2 further including the step of not cooling the cargo container if at least one of the ambient cargo container temperature is less than said temperature threshold value, and the internal cargo container temperature is less than the effective set-point temperature level.

4. The method defined in claim 1 wherein said effective set-point temperature level is furthermore determined by at least one of a mass and a specific heat of a cargo, a mass of said cargo container, a specific heat of said cargo container, an insulating ability of said cargo container, an air infiltration of said cargo container, the predetermined time, and the predetermined ambient temperature.

5. The method defined in claim 1 further including the step of not cooling the cargo container if the internal cargo temperature is less than the effective set-point temperature level.

6. A temperature monitoring and control system for monitoring and controlling the temperature level inside a cargo container, said cargo container having a cargo, having a refrigeration system for cooling said cargo, and having a set-point for said refrigeration system, said temperature monitoring and control system comprising:

temperature sensing means for monitoring a temperature level within said cargo container;

data processing means for responding to a stored program and that includes means for processing data monitored via said temperature sensing means;

data entering means for supplying temperature data monitored by said temperature sensing means to said data processing means;

data storing means for storing said program, for storing discrete data associated with said temperature sensing means, and for supplying said stored program and said discrete data to said data processing means;

said program including refrigeration control means for controlling said refrigeration system, said refrigeration control means including first enabling means for enabling said cooling only if said inside cargo container temperature is greater than an effective set-point temperature level determined by said set-point temperature;

wherein said cargo container is cooled via said refrigeration system if said internal cargo temperature is equal to or less than said effective set-point temperature level, and said data processing means executes said program; and whereby said inside cargo container temperature does not exceed said set-point temperature, and said ambient cargo container temperature exceeds a predetermined ambient temperature for a predetermined time.

7. The temperature monitoring and control system defined in claim 6 wherein said refrigeration control system includes second enabling means for enabling said cooling only when an ambient cargo container temperature exceeds a determined temperature level.

8. The temperature monitoring and control system defined in claim 7 wherein said refrigeration control means includes disenabling means for disenabling said cooling when at least one of said inside cargo container temperature is more than said effective set-point temperature level, and said ambient cargo container temperature does not exceed said determined temperature level.

9. The temperature monitoring and control system defined in claim 7 wherein said determined temperature level is determined by said set-point temperature.

10. The temperature monitoring and control system defined in claim 6 wherein said effective set-point temperature level is furthermore determined by at least one of a mass and a specific heat of said cargo, a mass of said cargo container, a specific heat of said cargo container, an insulating ability of said cargo container, an air infiltration of said cargo container said predetermined ambient temperature, and said predetermined time.

11. The temperature monitoring and control system defined in claim 6 wherein said refrigeration control means includes disenabling means for disenabling said cooling when said inside cargo container temperature is more than said effective set-point temperature level.

12. A refrigeration system for controlling a temperature within a cargo container having a cargo, the system comprising:

temperature sensor means for monitoring said temperature within said container, for monitoring a temperature ambient said container, for communicating said temperature within said container to a computer, and for communicating said temperature ambient said container to said computer; and said computer that includes a memory device;

a program resident on said memory device for execution by said computer;

wherein said refrigeration system enables a cooling of said container if both said ambient temperature exceeds a first prescribed temperature level and said temperature within said container exceeds a second prescribed temperature level to attain a set-point temperature that is at least partially sustained by said temperature within said container if said ambient temperature is less than a third prescribed temperature level for a predetermined time.

13. The refrigeration system defined in claim 12 wherein said refrigeration system disables said cooling if at least one of said temperature within said container is more than said second prescribed temperature level, and said ambient temperature does not exceed said first prescribed temperature level.

14. The refrigeration system defined in claim 13 wherein said second prescribed value is determined by at least one of a mass and a specific heat of said cargo, said set-point temperature, a mass of said cargo container, a specific heat of said cargo container, an insulating ability of said cargo container, an air infiltration entering said cargo container said third temperature level, and said predetermined time.

15. A refrigeration system for controlling a temperature within a cargo container having a cargo, the system comprising:

temperature sensor means for monitoring said temperature within said container, and for communicating said temperature within said container to a computer; and said computer that includes a memory device;

a program resident on said memory device for execution by said computer;

wherein said refrigeration system enables a cooling of said container if said temperature within said container exceeds a first prescribed temperature level to attain a set-point temperature that is at least partially sustained by said temperature within said container if said ambient temperature is less than a second prescribed temperature level for a predetermined time.

16. The refrigeration system defined in claim 15 wherein said refrigeration system disables said cooling if said temperature within said container is more than said first prescribed temperature level.

17. The refrigeration system defined in claim 16 wherein said first prescribed value is determined by at least one of a mass and a specific heat of said cargo, said set-point temperature, a mass of said cargo container, a specific heat of said cargo container, an insulating ability of said cargo container, said second temperature level, and said predetermined time.

* * * * *